(12) United States Patent
Takano et al.

(10) Patent No.: US 12,371,876 B2
(45) Date of Patent: Jul. 29, 2025

(54) WORK MACHINE

(71) Applicant: Kubota Corporation, Osaka (JP)

(72) Inventors: Yuki Takano, Osaka (JP); Kiyoshi Ueda, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 359 days.

(21) Appl. No.: 17/927,507

(22) PCT Filed: Mar. 15, 2021

(86) PCT No.: PCT/JP2021/010314
§ 371 (c)(1),
(2) Date: Nov. 23, 2022

(87) PCT Pub. No.: WO2021/250964
PCT Pub. Date: Dec. 16, 2021

(65) Prior Publication Data
US 2023/0203780 A1 Jun. 29, 2023

(30) Foreign Application Priority Data
Jun. 10, 2020 (JP) .................................. 2020-101011

(51) Int. Cl.
*B60K 11/04* (2006.01)
*B60K 13/02* (2006.01)
(Continued)

(52) U.S. Cl.
CPC ............ *E02F 9/0866* (2013.01); *B60K 11/04* (2013.01); *B60K 13/02* (2013.01); *E02F 9/0891* (2013.01); *F02M 35/048* (2013.01)

(58) Field of Classification Search
CPC ........ B60K 13/02; B60K 11/04; F02M 35/04; F02M 35/048; E02F 9/00; E02F 9/0866; E02F 9/0891
(Continued)

(56) References Cited

U.S. PATENT DOCUMENTS

| 7,527,115 | B2 * | 5/2009 | Tsuya ..................... B62K 11/04 |
| | | | 123/41.6 |
| 7,758,680 | B2 * | 7/2010 | Oka ........................ B62D 25/10 |
| | | | 55/482 |

(Continued)

FOREIGN PATENT DOCUMENTS

| JP | 3-132429 A | 6/1991 |
| JP | 2006-273309 A | 10/2006 |

(Continued)

OTHER PUBLICATIONS

European Office Action for Application No. 21822124.0, dated May 29, 2024, 9 pages.
(Continued)

*Primary Examiner* — James A Shriver, II
*Assistant Examiner* — Hilary L Johns
(74) *Attorney, Agent, or Firm* — McCarter & English, LLP

(57) ABSTRACT

Achieved are reduction of noise which is caused by air intake sound of a pre-cleaner, improvement of rear viewability and rear visibility of an operator, and extension of a maintenance interval of the pre-cleaner. A wheel loader (1) includes: an engine (18); a hood (23) that covers, in an openable and closable manner, a space in which the engine (18) is contained and that has an air intake opening (23a) through which air is taken into the space; an air cleaner (33) that is contained in the space and that is connected to the engine (18) via a first air intake pipe (34); and a pre-cleaner
(Continued)

(31) that is contained in the space and that is connected to the air cleaner (33) via a second air intake pipe (32).

6 Claims, 6 Drawing Sheets

(51) Int. Cl.
*E02F 9/08* (2006.01)
*F02M 35/04* (2006.01)

(58) Field of Classification Search
USPC ....................................................... 180/68.3
See application file for complete search history.

(56) References Cited

U.S. PATENT DOCUMENTS

| | | | | |
|---|---|---|---|---|
| 8,172,021 | B2* | 5/2012 | Setoguchi | F02M 35/04 |
| | | | | 180/68.3 |
| 8,251,170 | B2* | 8/2012 | Miura | B60K 13/02 |
| | | | | 180/68.1 |
| 9,267,267 | B1* | 2/2016 | Kamimae | E02F 9/0841 |
| 2005/0155806 | A1* | 7/2005 | Kanehira | F02M 35/161 |
| | | | | 180/291 |
| 2006/0065231 | A1* | 3/2006 | Nozaki | F02M 35/024 |
| | | | | 123/198 E |
| 2007/0045029 | A1* | 3/2007 | Nozaki | F02M 35/162 |
| | | | | 180/300 |
| 2008/0168904 | A1* | 7/2008 | Oka | B60K 11/02 |
| | | | | 96/416 |
| 2010/0078240 | A1* | 4/2010 | Miura | B60K 13/02 |
| | | | | 180/68.3 |
| 2016/0069043 | A1* | 3/2016 | Kamimae | E02F 9/0883 |
| | | | | 180/309 |
| 2017/0218832 | A1* | 8/2017 | Kurokawa | B62D 25/04 |

FOREIGN PATENT DOCUMENTS

| | | |
|---|---|---|
| JP | 2014-5630 A | 1/2014 |
| JP | 2014-114743 A | 6/2014 |
| JP | 2019-76034 A | 5/2019 |
| WO | 2006/092907 A1 | 9/2006 |

OTHER PUBLICATIONS

International Search Report and Written Opinion for Application No. PCT/JP2021/010314, dated May 18, 2021, 11 pages.
International Preliminary Report on Patentability for Application No. PCT/JP2021/010314, dated Dec. 22, 2022, 12 pages.

* cited by examiner

WORK MACHINE

CROSS-REFERENCE TO RELATED APPLICATIONS

This application is a 35 U.S.C. § 371 national stage filing of International Application No. PCT/JP2021/010314, filed on Mar. 15, 2021, which in turn claims priority to Japanese Patent Application No. 2020-101011, filed Jun. 10, 2020. The entire contents of each of the foregoing applications are included herein by reference in their entirety.

TECHNICAL FIELD

The present invention relates to a work machine such as a wheel loader.

BACKGROUND ART

Conventionally, a work machine, such as a wheel loader, which includes an air cleaner and a pre-cleaner has been known. The air cleaner separates a foreign material which is contained in the air on an air intake side of an engine. The pre-cleaner separates a foreign material which is contained in the air, on an upstream side of the air cleaner and in advance of the air cleaner.

For example, Patent Literature 1 discloses a construction machine (such as a hydraulic excavator, and a wheel loader) which includes: an air cleaner; a pre-cleaner; and a duct member which connects the cleaner and the pre-cleaner, the construction machine being capable of keeping the function of the air cleaner favorable, by preventing water droplets that have entered the duct member from being sucked into the air cleaner.

CITATION LIST

Patent Literature

Patent Literature 1

Japanese Patent Application Publication Tokukai No. 2014-5630

SUMMARY OF INVENTION

Technical Problem

However, in a configuration disclosed in Patent Literature 1, the pre-cleaner is attached to an upper surface of a hood so as to be exposed to the outside. Therefore, there is a problem in that air intake sound of the pre-cleaner is noisy for an operator who works at the front of the pre-cleaner. In addition, the air intake sound of the pre-cleaner which is exposed to the outside may be noisy not only for the operator but also in surroundings of the work machine.

Further, the pre-cleaner which is attached to the upper surface of the hood also blocks a rear view of the operator. This causes a problem in that the operator has reduced rear viewability and reduced rear visibility. Furthermore, since the pre-cleaner which is exposed to the outside directly sucks in a foreign material which is contained in air. This inevitably increases the amount of the foreign material that is sucked in. Therefore, there is a problem in that in order to maintain performance, maintenance has to be frequently performed.

An aspect of the present invention has been made in view of the above problems. An object of an embodiment of the present invention is to provide a work machine which achieves reduction of noise which is caused by air intake sound of a pre-cleaner, improvement of rear viewability and rear visibility of an operator, and extension of a maintenance interval of the pre-cleaner.

Solution to Problem

In order to solve the above problems, a work machine in accordance with an aspect of the present invention includes: an engine; a hood that covers, in an openable and closable manner, a space in which the engine is contained and that has an air intake opening through which air is taken into the space; an air cleaner that is contained in the space and that is connected to the engine via a first air intake pipe; and a pre-cleaner that is contained in the space and that is connected to the air cleaner via a second air intake pipe.

Advantageous Effects of Invention

An aspect of the present invention makes it possible to achieve reduction of noise which is caused by air intake sound of a pre-cleaner, improvement of rear viewability and rear visibility of an operator, and extension of a maintenance interval of the pre-cleaner.

DESCRIPTION OF EMBODIMENTS

Embodiment 1

1. Schematic Configuration of Wheel Loader 1

Figure 1:
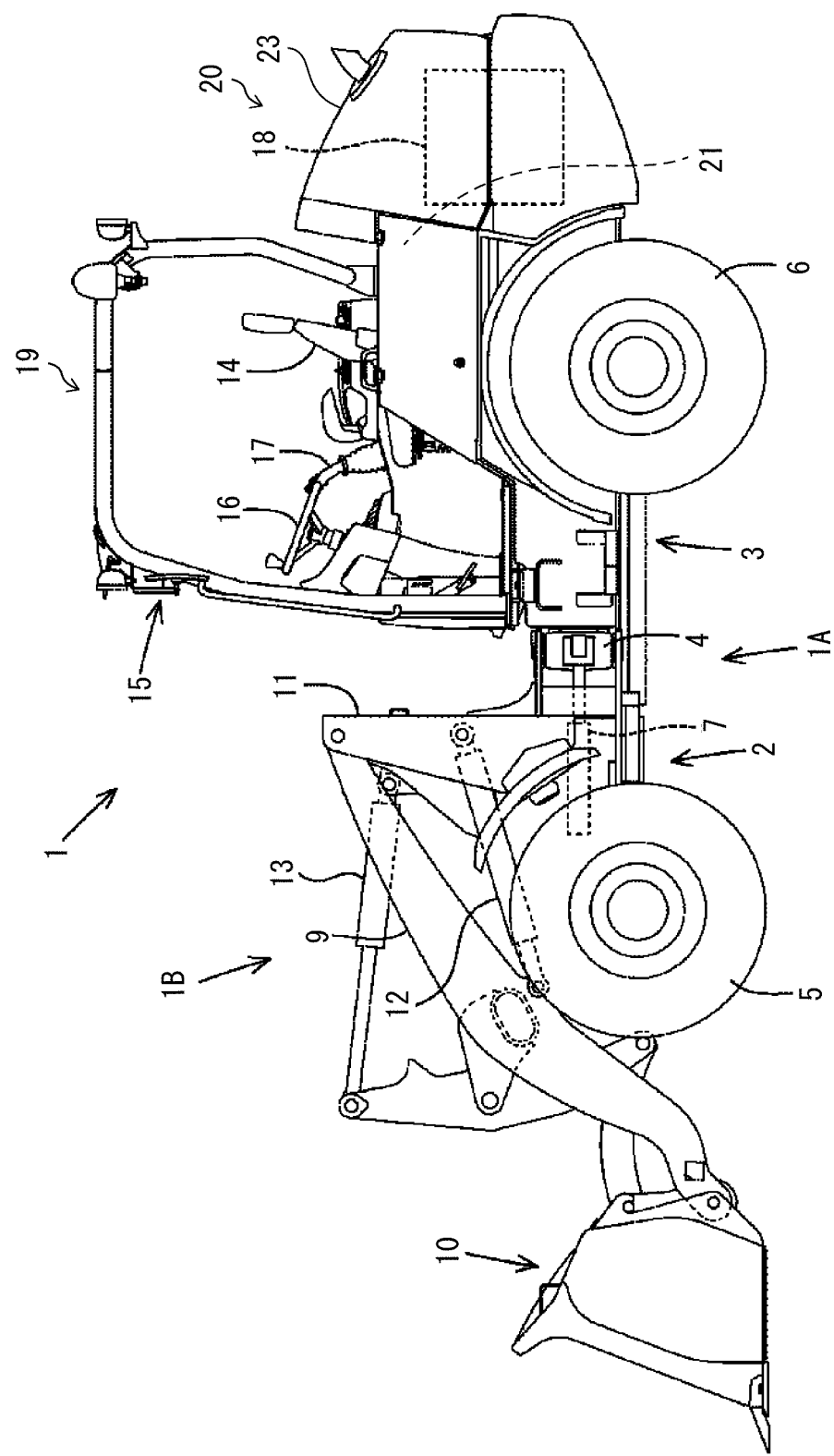
FIG. 1 is a side view illustrating a configuration of a wheel loader in accordance with Embodiment 1.

FIG. 1 is a side view illustrating a configuration of a wheel loader 1. The wheel loader 1 is an articulated work machine, and includes a traveling machine body 1A and a working device 1B (front working device). The traveling machine body 1A is composed of a front part 2 and a rear part 3 of that machine body. The following description, a side where the working device 1B is positioned with respect to the traveling machine body 1A is assumed to be front and a side opposite to the front is rear, and in a frontward direction, a left side is assumed to be left-hand and a right side is assumed to be right-hand.

A pair of left and right front wheels 5 is provided in the front part 2 of the machine body, and a pair of left and right rear wheels 6 is provided in the rear part 3 of the machine body. The rear part 3 of the machine body is provided, at a front end thereof, with a connecting member 4. The connecting member 4 is provided rotatably in a predetermined range around an axial center in a front-rear direction. The front part 2 of the machine body is connected, at a rear end thereof, to the connecting member 4 swingably to left and right about the axial center in a vertical direction. Further, the wheel loader 1 is provided with a steering cylinder 7 which is composed of a hydraulic cylinder, over the connecting member 4 and the front part 2 of the machine body. The steering cylinder 7 is expanded and contracted. This allows the front part 2 of the machine body to swing leftward and rightward with respect to the rear part 3 of the machine body, so that the wheel loader 1 can turn left and right.

The working device 1B has a pair of left and right lift arms 9 and a bucket 10. The left and right lift arms 9 can swing vertically since respective proximal ends of the left and right lift arms 9 are supported, by a support frame 11 which is provided in the front part 2 of the machine body, rotatably about an axial center in a left-right direction. The bucket 10 is pivotally connected to respective distal ends of the left and right lift arms 9, swingably about the axial center in the left-right direction. The left and right lift arms 9 are driven by a lift cylinder 12, and the bucket 10 is driven by a bucket cylinder 13. The lift cylinder 12 and the bucket cylinder 13 are each composed of a hydraulic cylinder. Further, the bucket 10 is detachably provided, and an attachment such as a sweeper, a mower, or a breaker can be attached, instead of the bucket 10, to the distal ends of the lift arms 9.

The rear part 3 of the machine body is provided with a driving section 19 and a prime mover section 20. The driving section 19 is provided in a front portion of the rear part 3 of the machine body, and the prime mover section 20 is provided in a rear portion of the rear part of the machine body 3. The driving section 19 includes a driver seat 14, a four-post canopy 15 as a protective device for the driver seat 14, a steering wheel 16 for operating the steering cylinder 7, and a working device operating lever 17 for operating the working device 1B. The driving section 19 is not limited to such a canopy type as described above, and may be a cabin type.

2. Configuration of Prime Mover Section 20

Figure 2:
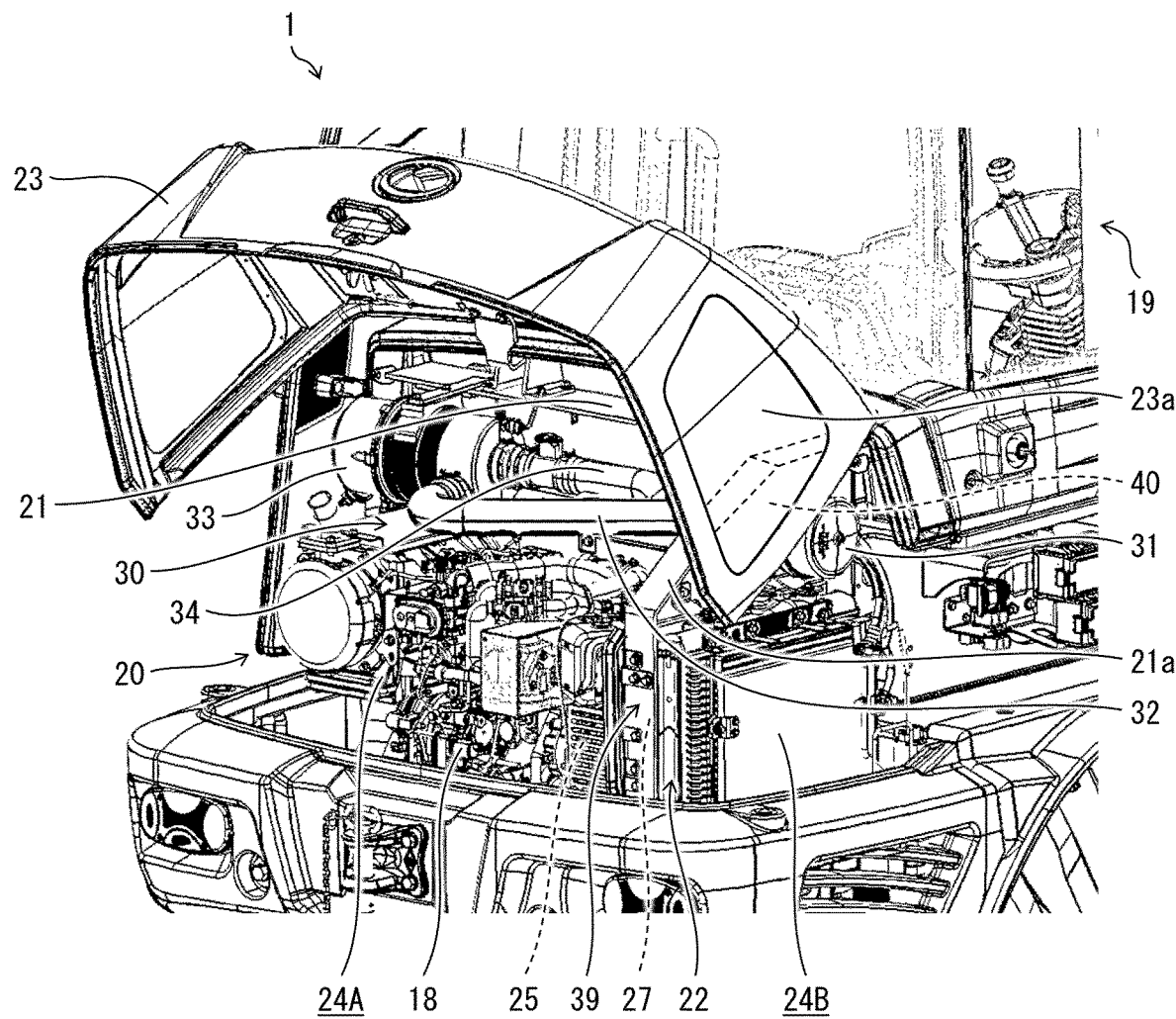
FIG. 2 is a perspective view illustrating a configuration of a prime mover section that is located in a rear portion of the wheel loader as viewed from diagonally backward right, in a state in which a hood is opened.

FIG. 2 is a perspective view illustrating a configuration of the prime mover section 20 that is located in a rear portion of the wheel loader 1 as viewed from diagonally backward right. FIG. 2 shows a state in which the hood 23 is opened. As illustrated in FIG. 2, the prime mover section 20 includes an engine 18, a cooling fan 25, a radiator (cooling device) 22, and an air intake structure 30 which is for supplying combustion air to the engine 18. The prime mover section 20 has a periphery thereof covered by the hood 23. The hood 23 is provided so as to be openable and closable. The hood 23 is connected to a machine body frame 21, rotatably in a predetermined range about the axial center in the left-right direction.

The hood 23 has a right surface which is provided with an air intake opening 23a for taking ambient air into a space that is covered by the hood 23. The air intake opening 23a can be configured by, for example, providing a punching metal, a dustproof net, or the like in an opening or a notch portion which is provided on the right surface of the hood 23. The ambient air is taken into the space which is covered by the hood 23 through the air intake opening 23a.

The engine 18 is mounted in the space which is covered by the hood 23 so as to be supported by the machine body frame 21. The engine 18 drives, with power thereof, a motor (not illustrated), and the front wheels 5 and rear wheels 6 (see FIG. 1) are driven by rotational power that is outputted from the motor. The traveling machine body 1A travels by transmission of the rotational power of the motor to the front wheels 5 and the rear wheels 6. The engine 18 also drives, with the power thereof, a hydraulic pump, and supplies hydraulic oil to each of hydraulic actuators (steering cylinder 7, lift cylinder 12, bucket cylinder 13, etc.). The working device 1B is operated by supply of the hydraulic oil to each of those hydraulic actuators. The engine 18 may be a diesel engine, a gasoline engine, an LPG engine or an electric motor, or may be a hybrid-type which has an engine and an electric motor.

The radiator 22 is provided on the right side of the engine 18 in the space which is covered by the hood 23. The radiator 22 is connected with a cooling water channel of the engine 18 via a cooling water pipe in which a circulation pump (not illustrated) is interposed between the radiator 22 and the cooling water channel. The engine 18 is cooled with cooling water which circulates through the radiator 22 and the engine 18. The radiator 22 is configured to cool the cooling water from the engine 18 and send the cooling water thus cooled back to the engine 18.

The cooling fan 25 constitutes a side part of the engine 18, and is provided between the engine 18 and the radiator 22. As a result of driving the cooling fan 25, the ambient air is taken in via the air intake opening 23a and an air flow is produced. The engine 18 and the radiator 22 are cooled by the air flow.

The engine 18 is provided in an engine room (first space) 24A while the radiator 22 and other elements are provided in an ambient air chamber (second space) 24B. The engine room 24A and the ambient air chamber 24B are partitioned from each other by a partition part 39. The partition part 39 is constituted by a leg part 21a which is connected to the machine body frame 21, a partition structure 40 which is provided between an upper portion of the leg part 21a and an upper surface of the radiator 22 and which closes a space above the radiator 22, a shroud 27 which is provided between the engine 18 and the radiator 22, and the like. The partition structure 40 has a hole 40a formed therein. The hole 40a is for allowing a second air intake pipe 32 to pass therethrough (see FIG. 3). In order that a gap between the hood 23 and the partition part 39 can be reliably sealed in a state in which the hood 23 is closed, the hood 23 has an inner surface where a sealing material is provided at a position corresponding to the partition part 39.

3. Installation of Air Intake Structure 30 and Pre-Cleaner 31

Figure 3:
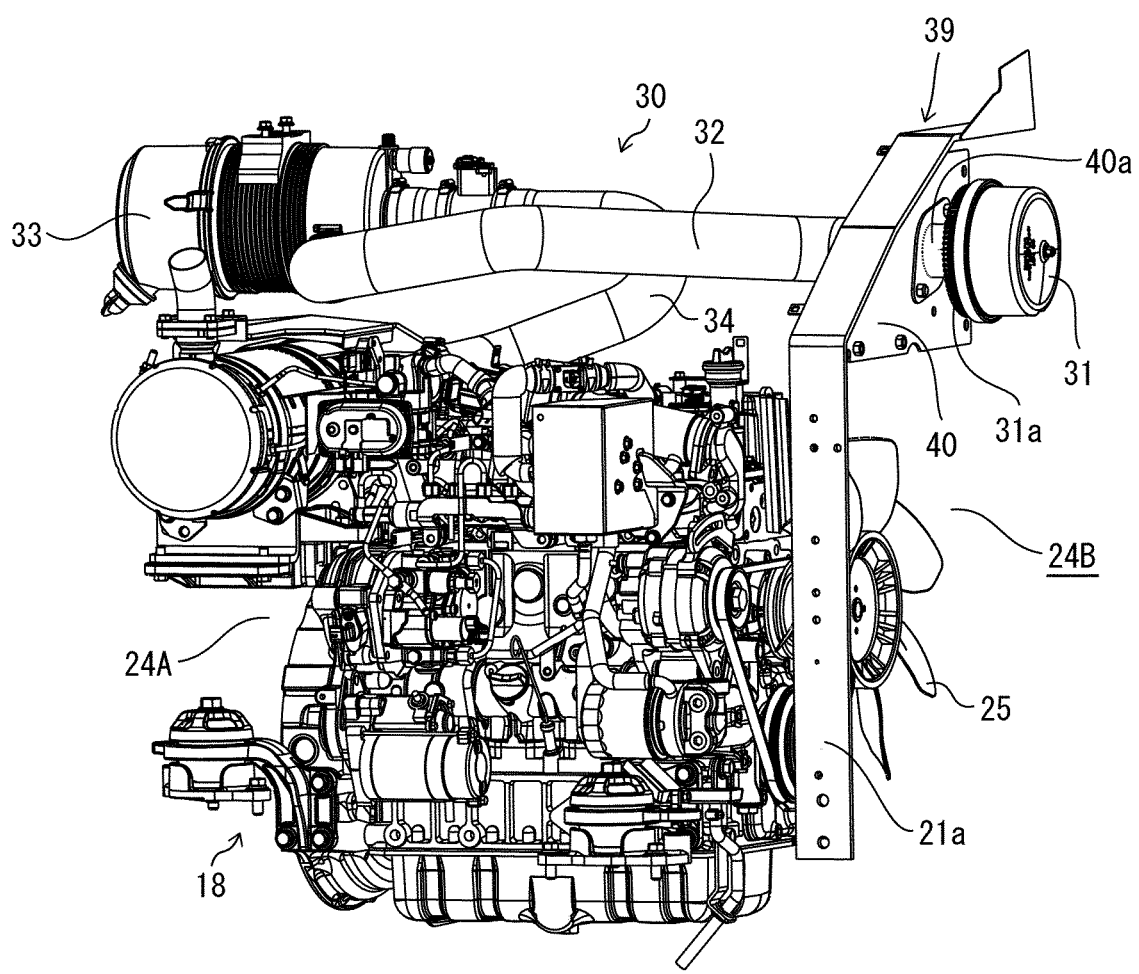
FIG. 3 is a perspective view illustrating an engine and an air intake structure which are located in a space which is covered by the hood and which is in the prime mover section illustrated in FIG. 2, as viewed from diagonally backward right.
Figure 4:
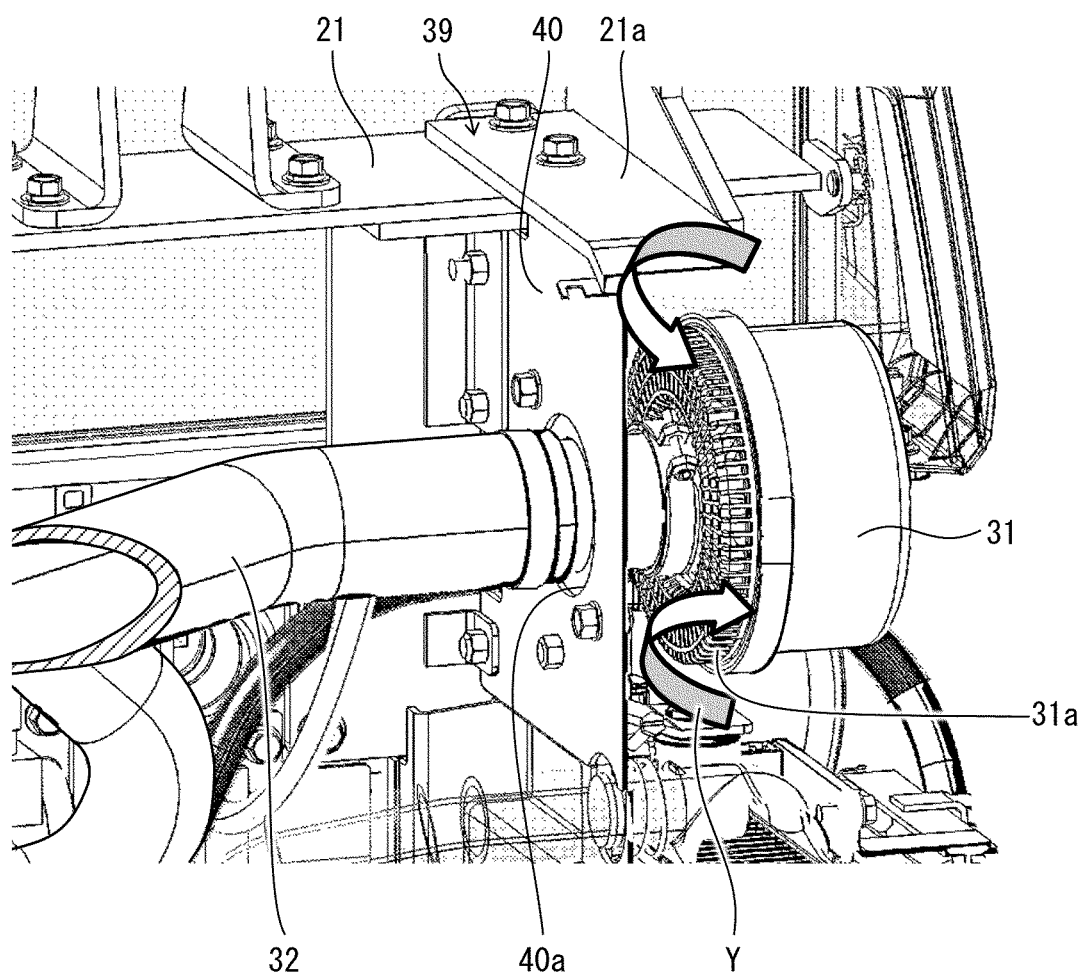
FIG. 4 is a perspective view illustrating a portion where a pre-cleaner is provided in the air intake structure illustrated in FIG. 3, as viewed from diagonally backward left.
Figure 5:
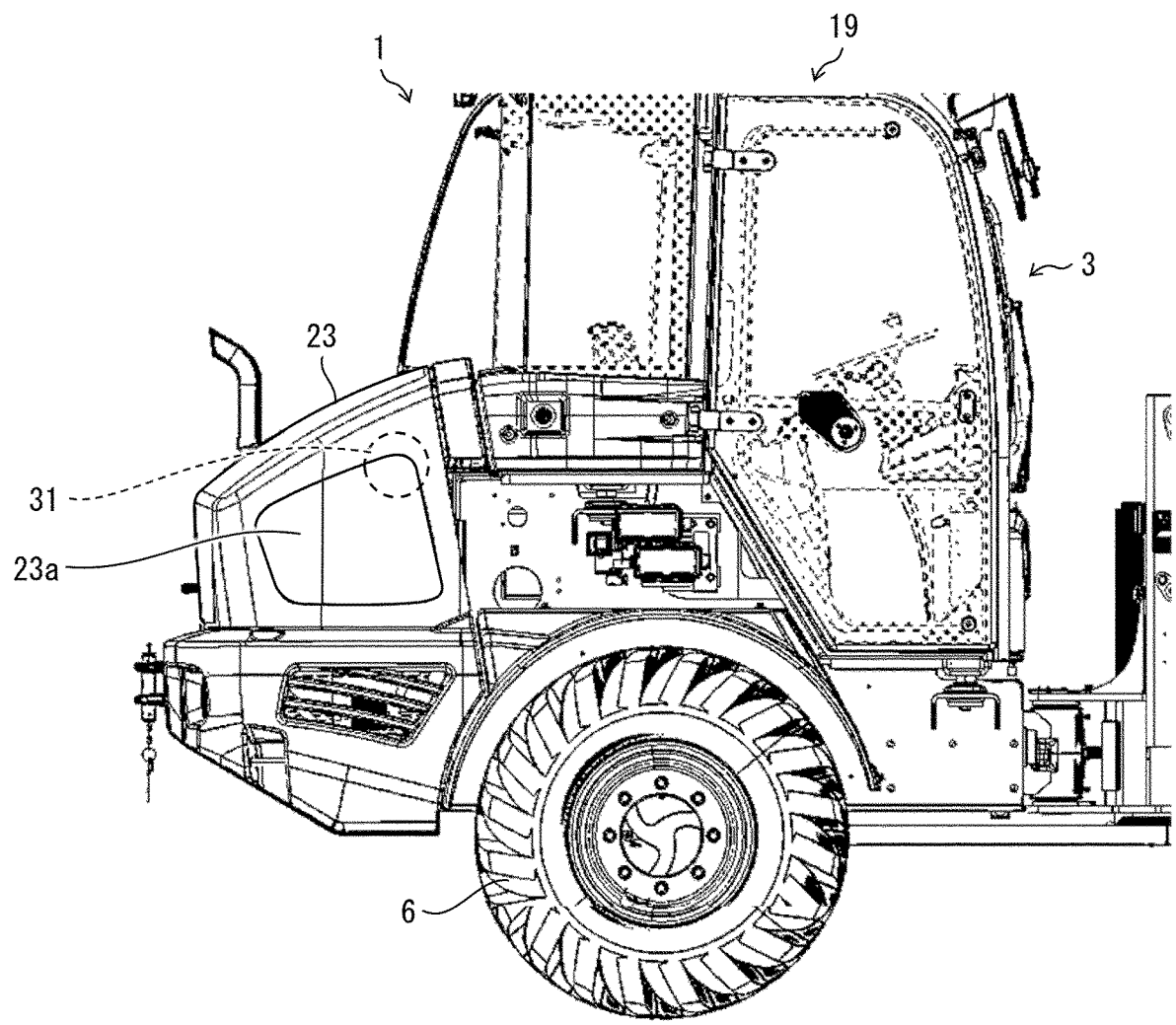
FIG. 5 is a right side view illustrating a configuration of a rear part of a machine body of the wheel loader illustrated in FIG. 1, in a state in which the hood is closed.
Figure 6:
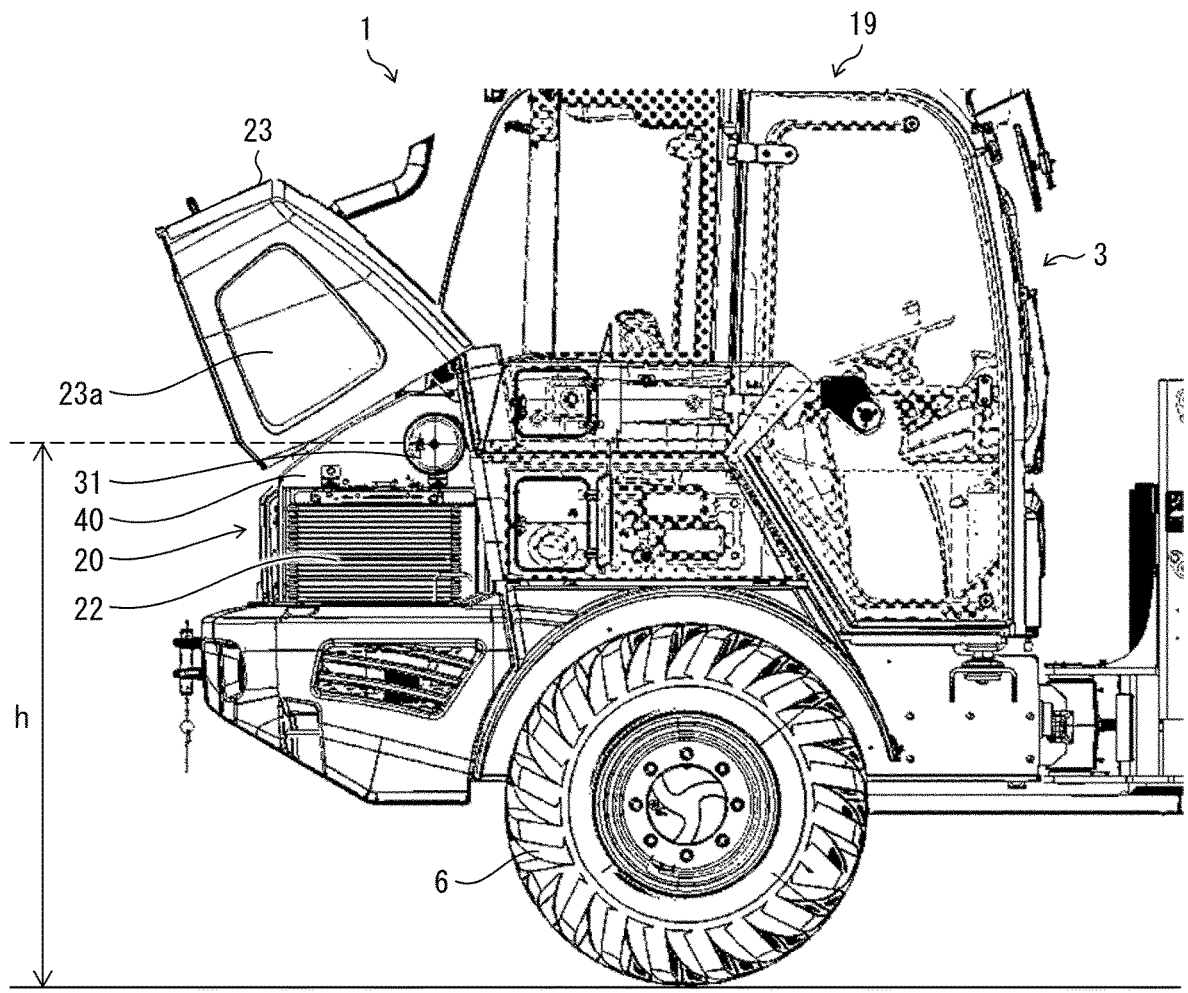
FIG. 6 is a right side view illustrating a configuration of a rear part of the machine body of the wheel loader illustrated in FIG. 1, in a state in which the hood is opened.

FIG. 3 is a perspective view illustrating the engine 18 and the air intake structure 30 which are located in the space which is covered by the hood 23, as viewed from diagonally backward right. It should be noted that the radiator 22, the shroud 27, and the like are omitted in FIG. 3. FIG. 4 is a perspective view illustrating a portion where the pre-cleaner 31 is provided in the air intake structure 30, as viewed from diagonally backward left. It should be noted that in FIG. 4, the partition part 39 and the second air intake pipe 32 in part exhibit respective cross sections. FIG. 5 is a right side view illustrating a configuration of the rear part 3 of the machine body in a state in which the hood 23 is closed. FIG. 6 is a right side view illustrating a configuration of the rear part 3 of the machine body in a state in which the hood 23 is opened.

As illustrated in FIG. 3, the air intake structure 30 includes the pre-cleaner 31, the second air intake pipe 32, an air cleaner 33, and a first air intake pipe 34. The air cleaner 33 separates a foreign material (dust and/or dirt) which is contained in the air on an air intake side of the engine 18. The pre-cleaner 31 removes the foreign material which is contained in the air in advance of the air cleaner 33. The pre-cleaner 31 is connected to the air cleaner 33 via the second air intake pipe 32. The air cleaner 33 is connected to an air intake port of the engine 18 via the first air intake pipe 34. The pre-cleaner 31, the second air intake pipe 32, the air cleaner 33, the first air intake pipe 34, and an air intake port of the engine 18 are connected to each other by welding flanges that are provided at respective insertion openings or by fastening around the insertion openings with bands.

Of these components which constitute the air intake structure 30, the second air intake pipe 32 and the air cleaner 33 are provided in the engine room 24A in the space which is covered by the hood 23 and above the engine 18. The air cleaner 33 is supported by the machine body frame 21 (see FIG. 2).

In contrast, the pre-cleaner 31 is provided in the ambient air chamber 24B in the space which is covered by the hood 23. The pre-cleaner 31 is supported by the partition structure 40. In particular, the pre-cleaner 31 is mounted and fixed such that a pipe portion of the pre-cleaner 31 fits in the hole 40a which is formed in the partition structure 40. The first air intake pipe 34 is provided over the engine room 24A and the ambient air chamber 24B through the hole 40a which is formed in the partition structure 40.

As shown in FIG. 4, the pre-cleaner 31 has a suction port 31a and sucks in air through the suction port 31a. The pre-cleaner 31 can be, for example, a centrifuge type pre-cleaner which removes a foreign material in the air by centrifugation with use of a fixed vane. Such a centrifugal pre-cleaner 31 separates the foreign material in the air which has been introduced from the suction port 31a, by utilizing a swirling flow which is generated by the fixed vane inside the pre-cleaner 31.

The air which has been cleaned by the pre-cleaner 31 passes through the second air intake pipe 32 and is supplied to the air cleaner 33 (see FIG. 3). The air which has been supplied to the air cleaner 33 is further cleaned by a filter in the air cleaner 33, and then supplied to the engine 18 as combustion air through the first air intake pipe 34.

As illustrated in FIG. 4, in the present embodiment, the pre-cleaner 31 is installed such that the suction port 31a faces to the left so as not to face the air intake opening 23a which faces the ambient air chamber 24B and which is provided on the right side. In other words, the pre-cleaner 31 is installed such that the suction port 31a faces away from the side where the air intake opening 23a, which allows the ambient air chamber 24B to communicate with the outside, is located. As a result, the pre-cleaner 31 sucks in the air between the pre-cleaner 31 and the partition structure 40 through the suction port 31a. FIG. 4 indicates, with an arrow Y, a flow of the air which is sucked in through the suction port 31a.

Further, as shown in FIGS. 5, and 6, in the present embodiment, the hood 23 has a shape that inclines downward toward the rear in a state in which the hood 23 is closed, and the partition structure 40 lowers in height toward the rear in accordance with the shape of the hood 23. The pre-cleaner 31 is attached to a relatively high front portion of the partition structure 40. Then, as illustrated in FIG. 5, the pre-cleaner 31 is provided at a position at which, in a state in which the hood 23 is closed, the pre-cleaner 31 as viewed from the right side has an upper portion hidden by the hood 23 and a lower portion visible through the air intake opening 23a. Further, as illustrated in FIG. 6, in the present embodiment, the pre-cleaner 31 is provided at a position at which a whole of the pre-cleaner 31 is exposed to the outside in a state in which the hood 23 is fully opened.

4. Effects

In the above configuration, as shown in FIGS. 2 to 5, the pre-cleaner 31 is installed in the space which is covered by the hood 23. This configuration makes it possible to reduce air intake sound of the pre-cleaner 31 by shielding the air intake sound by the hood 23. As compared to a configuration in which the pre-cleaner 31 is installed outside a hood, it is possible to reduce noise due to air intake by the pre-cleaner 31 for an operator and in surroundings of the wheel loader 1.

Further, in the configuration in which the pre-cleaner 31 is installed outside the hood 23, the pre-cleaner 31 sucks in a large amount of foreign materials which are contained in ambient air because the pre-cleaner 31 directly sucks in the ambient air. However, since the pre-cleaner 31 is installed in the space which is covered by the hood 23, the pre-cleaner 31 sucks in the air from the space which is covered by the hood 23. Therefore, the amount of the foreign material which the pre-cleaner 31 sucks in can be reduced as compared to the configuration in which the ambient air is directly sucked in. This can extend the life of the pre-cleaner 31 and also can extend a maintenance interval.

Figure 7:
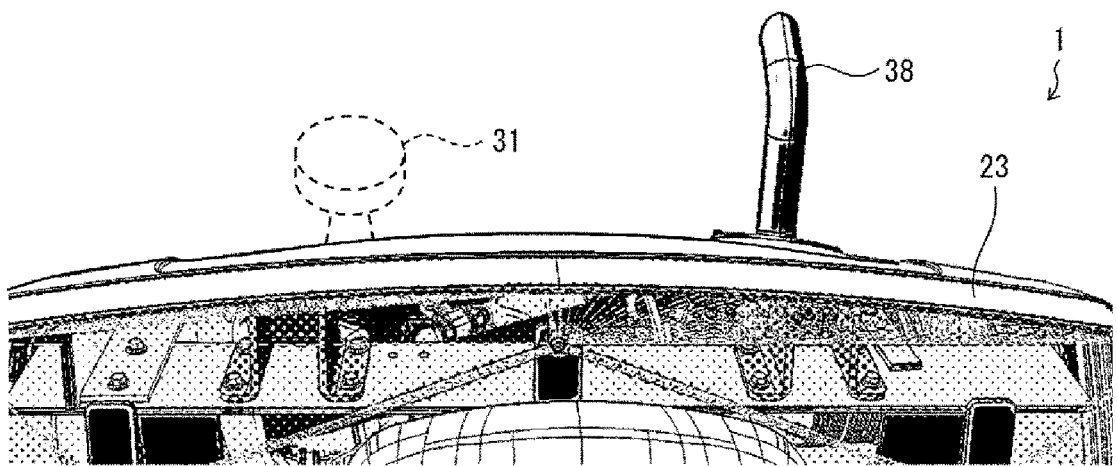
FIG. 7 is an explanatory diagram illustrating a view in a case where a rear side where the hood is present is viewed from a driver seat of the wheel loader illustrated in FIG. 1.

Further, the pre-cleaner 31 is installed in the space which is covered by the hood 23. This can provide a better rear visibility of the operator as compared to a configuration in which the pre-cleaner 31 is located above the hood 23 as illustrated in FIG. 7 with an imaginary line. This can improve the rear viewability and the rear visibility of the operator. Note that FIG. 7 is an explanatory diagram illustrating a view in a case where a rear side where the hood 23 is present is viewed from the driver seat 14. FIG. 7 shows an outlet, which is a member indicated by the reference sing 38.

Furthermore, while the wheel loader 1 works, radiant heat of the engine 18 warms the air inside the engine room 24A. Accordingly, in a configuration in which the partition part 39 is not provided or in a configuration in which the pre-cleaner 31 is disposed in the engine room 24A, the pre-cleaner 31 sucks in the air which has been warmed by the radiant heat of the engine 18. As a result, efficiency of the engine 18 is reduced.

Generally, the lower the temperature, the higher the density of gas. Accordingly, when the temperature of the air (combustion air) that is supplied to the engine 18 is high, the density of the air is low and the engine 18 cannot obtain power efficiently. This is a cause of the above reduced efficiency of the engine 18. That is, it is preferable that the temperature of the air which is sucked in by the pre-cleaner 31 be low.

In the present embodiment, as illustrated in FIGS. 2 and 3, the pre-cleaner 31 is installed in the ambient air chamber 24B which is partitioned by the partition part 39 from the engine room 24A in which the engine 18 is provided.

Therefore, the pre-cleaner 31 can suck in the air from the ambient air chamber 24B at a temperature close to the temperature of the ambient air without sucking in the air which has been warmed by the radiant heat of the engine 18. This makes it possible to supply, to the engine 18, air (combustion air) at a low temperature. This consequently allows the engine 18 to efficiently obtain power.

Further, in the present embodiment, as illustrated in FIGS. 3 and 6, the pre-cleaner 31 is fixed, above the shroud 27, to the partition structure 40 with which the engine room 24A and the ambient air chamber 24B are partitioned from each other. This makes it possible to provide the pre-cleaner 31 in an upper portion of the ambient air chamber 24B, by utilizing a dead space which has been conventionally vacant.

In the above configuration, as illustrated in FIG. 3, the air cleaner 33 is provided in the engine room 24A. This makes it possible to provide the air cleaner 33 and the pre-cleaner 31 by effectively utilizing limited spaces of the engine room 24A and the ambient air chamber 24B.

In the above configuration, as illustrated in FIG. 4, the pre-cleaner 31 is installed such that the suction port 31a is located on a pre-cleaner's surface that differs from another pre-cleaner's surface that faces the air intake opening 23a. In rainy weather or during car wash, water may enter, through the air intake opening 23a, the space which is covered by the hood 23 and fall on the pre-cleaner 31. However, the above configuration makes it possible to prevent water from entering the pre-cleaner 31. Thus, it is possible to prevent a failure of the engine 18 due to sucking in water.

Further, in the present embodiment, as illustrated in FIG. 5, a part of the pre-cleaner 31 is located above an upper edge of the air intake opening 23a as viewed from the right side (front of the air intake opening 23a). This prevents water that has entered the space which is covered by the hood 23 through the air intake opening 23a from coming around to the suction port 31a. This consequently makes it possible to more effectively prevent water from entering into the pre-cleaner 31. Note that although the present embodiment has described a configuration in which a part of the pre-cleaner 31 is located above the upper edge of the air intake opening 23a as viewed from the right side, the present embodiment is not limited to such a configuration, and may be configured such that the whole of the pre-cleaner 31 is located above the upper edge of the air intake opening 23a as viewed from the right side.

Further, as illustrated in FIG. 6, in the present embodiment, the pre-cleaner 31 is provided at a position at which the pre-cleaner 31 is exposed in a state in which the hood 23 is fully opened. This makes it easy to perform attachment/detachment, cleaning, maintenance, etc. of the pre-cleaner 31. In particular, in the present embodiment, the pre-cleaner 31 is provided at a position at which the whole of the pre-cleaner 31 is exposed in a state in which the hood 23 is fully opened, and the pre-cleaner 31 is attached such that the pre-cleaner 31 is inserted in the hole 40a which is formed in the partition structure 40. Therefore, the pre-cleaner 31 can be easily inserted/removed.

In a case where the pre-cleaner 31 is attached to the upper surface of the hood 23, the pre-cleaner 31 is located at a height of approximately 1 m 80 cm from the ground. This makes workability inferior. In contrast, in the present embodiment, the pre-cleaner 31 is attached to the space which is covered by the hood 23. Therefore, the height (h) from the ground illustrated in FIG. 6 can be approximately 1 m 60 cm, and workability can be improved. Note that although, in the above the embodiment, the ambient air chamber 24B is provided on the right side of the engine room 24A, the ambient air chamber 24B may be provided on the left side of 24A.

It should be noted that although the present embodiment has described an example in which the present invention is applied to a wheel loader that is an embodiment of a work machine, the subject matter to which the present invention is applicable is not limited to the work loader, and can be applied to other forms of work machines, for example, construction machines such as a backhoe, a skid-steer loader, and a compact track loader, and agricultural machines such as a tractor, and a combine.

Aspects of the present invention can also be expressed as follows:

In order to solve the above problems, a work machine in accordance with an aspect of the present invention includes: an engine; a hood that covers, in an openable and closable manner, a space in which the engine is contained and that has an air intake opening through which air is taken into the space; an air cleaner that is contained in the space and that is connected to the engine via a first air intake pipe; and a pre-cleaner that is contained in the space and that is connected to the air cleaner via a second air intake pipe.

According to the above configuration, the pre-cleaner is contained in the space that is covered by the hood. Accordingly, it is possible to reduce air intake sound of the pre-cleaner by shielding the air intake sound by the hood. This makes it possible to reduce noise due to air intake by the pre-cleaner to an operator and in surroundings of the work machine. Further, since the pre-cleaner sucks in the air from the space which is covered by the hood, the amount of a foreign material which the pre-cleaner sucks in can be reduced as compared to a configuration in which ambient air is directly sucked in. This can extend the life of the pre-cleaner and also can extend the maintenance interval. Further, it is possible to provide a good rear visibility of the operator by eliminating shielding which is made by the pre-cleaner. This can improve the rear viewability and the rear visibility of the operator.

A work machine according to an aspect of the present invention may be configured to further include a partition part that partitions the space covered by the hood, into a first space in which the engine is provided and a second space which communicates with outside via the air intake opening, the pre-cleaner being provided in the second space. According to the above configuration, the pre-cleaner is provided in the second space which is partitioned, by the partition part, from the first space in which the engine is provided. Therefore, the pre-cleaner can suck in the air from the second space at a temperature close to the temperature of the ambient air without sucking in the air which has been warmed by radiant heat of the engine. This makes it possible to supply, to the engine, air at a low temperature. This consequently makes it possible to efficiently obtain power from the engine.

A work machine according to an aspect of the present invention may be configured to further include: a cooling device provided in the second space; and a shroud between the cooling device and the engine, the partition part including, above the shroud, a partition structure which partitions the first space and the second space from each other, and the pre-cleaner being fixed to the partition structure. The above configuration makes it possible to provide the pre-cleaner in an upper portion of the second space, by utilizing a dead space which has been conventionally vacant.

A work machine according to an aspect of the present invention may be configured such that the air cleaner is provided in the first space. The above configuration makes it possible to provide the air cleaner and the pre-cleaner by effectively utilizing limited spaces of the first space and the second space.

A work machine according to an aspect of the present invention may be configured such that the pre-cleaner is installed such that a suction port of the pre-cleaner is located on a pre-cleaner's surface that differs from another pre-cleaner's surface that faces the air intake opening. The above configuration makes it possible to prevent water from entering the pre-cleaner even in a case where in rainy weather or during car wash, water enters, through the air intake opening, the space which is covered by the hood. This makes it possible to prevent a failure of the engine due to sucking in water.

A work machine according to an aspect of the present invention may be configured such that the pre-cleaner is installed such that a whole or a part of the pre-cleaner is located above an upper edge of the air intake opening as viewed from front of the air intake opening. This configuration prevents water that has entered, through the air intake opening, the space which is covered by the hood from coming around to the suction port. This consequently makes it possible to more effectively prevent water from entering the pre-cleaner.

A work machine according to an aspect of the present invention may be configured such that the pre-cleaner is installed at a position at which the pre-cleaner is exposed to outside in a state in which the hood is fully opened. This configuration makes it easy to perform attachment/detachment, cleaning, maintenance, etc. of the pre-cleaner, since the pre-cleaner is exposed in a state in which the hood is fully open.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST 1 wheel loader (work machine)
2 front part of machine body
3 rear part of machine body
14 driver seat
18 engine
22 radiator (cooling device)
23 hood
23a air intake opening
24A engine room (first space)
24B ambient air chamber (second space)
25 cooling fan
27 shroud
30 air intake structure
31 pre-cleaner
31a suction port
32 second air intake pipe
33 air cleaner
34 first air intake pipe

The invention claimed is:

1. A work machine comprising:
an engine;
a hood that covers, in an openable and closable manner, a space in which the engine is contained and that has an air intake opening through which air is taken into the space;
an air cleaner that is contained in the space and that is connected to the engine via a first air intake pipe; and
a pre-cleaner that is contained in the space and that is connected to the air cleaner via a second air intake pipe,
wherein the pre-cleaner is installed such that a suction port of the pre-cleaner faces away from a side of the hood in which the air intake opening is located.

2. The work machine as set forth in claim 1, further comprising:
a partition part that partitions the space covered by the hood, into a first space in which the engine is provided and a second space which communicates with outside via the air intake opening, the pre-cleaner being provided in the second space.

3. The work machine as set forth in claim 2, wherein the air cleaner is provided in the first space.

4. The work machine as set forth in claim 1, wherein the pre-cleaner is installed such that a whole or a part of the pre-cleaner is located above an upper edge of the air intake opening as viewed from a front of the air intake opening.

5. The work machine as set forth in claim 1, wherein the pre-cleaner is installed at a position at which the pre-cleaner is exposed to outside in a state in which the hood is fully opened.

6. A work machine comprising:
an engine;
a hood that covers, in an openable and closable manner, a space in which the engine is contained and that has an air intake opening through which air is taken into the space;
an air cleaner that is contained in the space and that is connected to the engine via a first air intake pipe;
a partition part that partitions the space covered by the hood, into a first space in which the engine is provided and a second space which communicates with outside via the air intake opening;
a pre-cleaner that is contained in the second space and that is connected to the air cleaner via a second air intake pipe;
a cooling device provided in the second space; and
a shroud between the cooling device and the engine,
the partition part including, above the shroud, a partition structure which partitions the first space and the second space from each other, and
the pre-cleaner being fixed to the partition structure.

* * * * *